2 Sheets—Sheet 1.
C. RICHARDS.
Fire-Escapes.
No. 199,934. Patented Feb. 5, 1878.
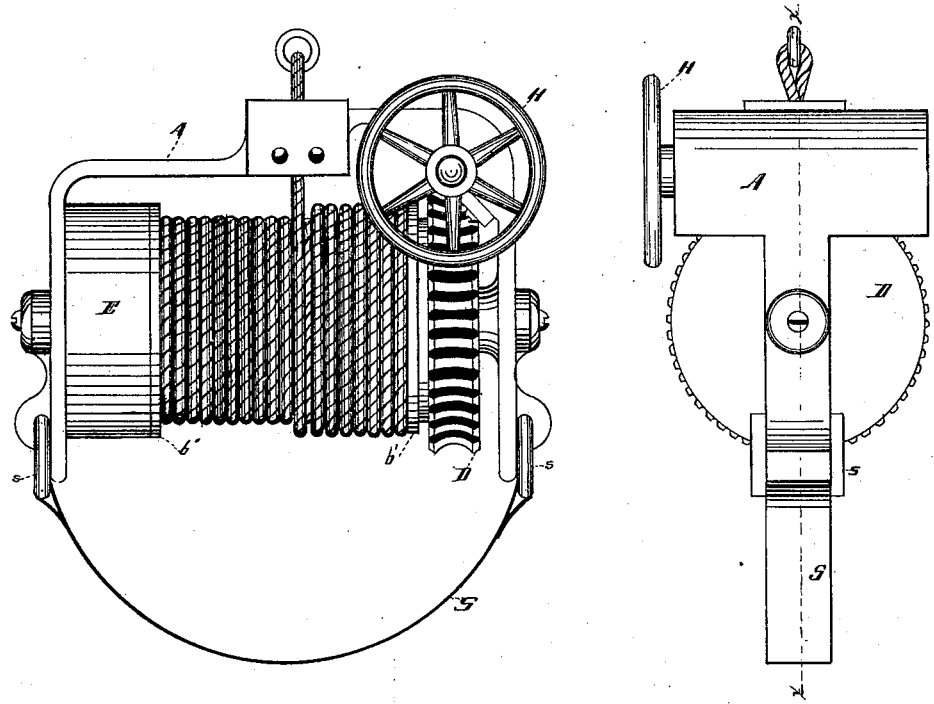
Fig 1.     Fig 2.
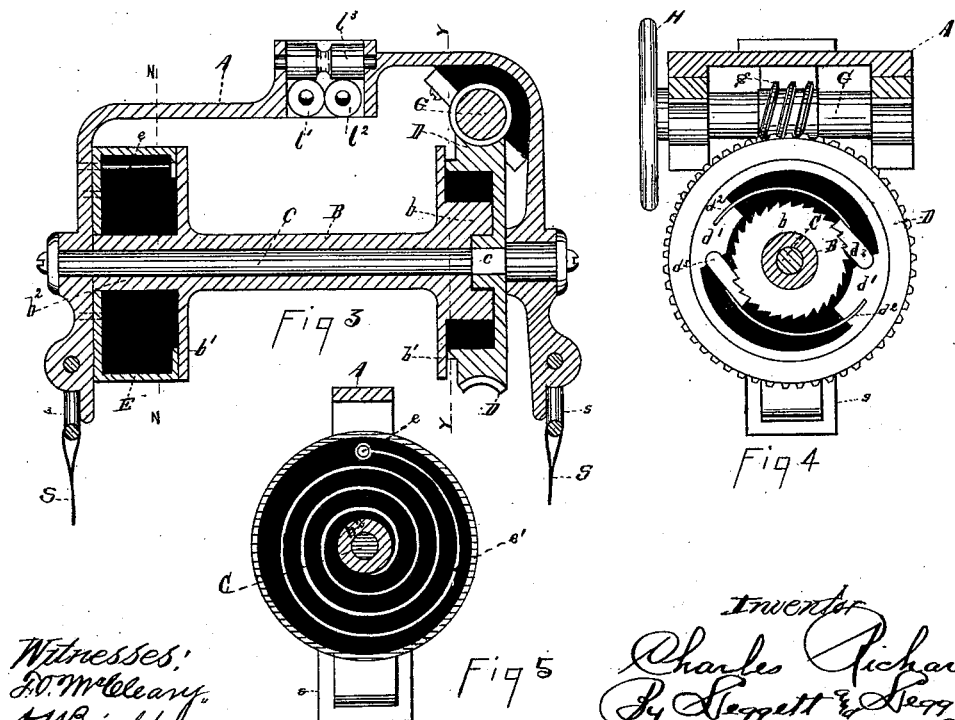
Fig 3.     Fig 4.
Fig 5.
Witnesses:
F.O. McCleary
A.W. Bright
Inventor
Charles Richards
By Leggett & Leggett
Attys
N. PETERS, PHOTO-LITHOGRAPHER, WASHINGTON, D. C.

2 Sheets—Sheet 2.

C. RICHARDS.
Fire-Escapes.

No. 199,934. Patented Feb. 5, 1878.

Witnesses:
H. C. McCleary
A. W. Bright

Inventor
Charles Richards
By Leggett and Leggett
Attys

UNITED STATES PATENT OFFICE.

CHARLES RICHARDS, OF CLEVELAND, OHIO, ASSIGNOR OF ONE-HALF HIS RIGHT TO LEO W. SAPP, OF SAME PLACE.

IMPROVEMENT IN FIRE-ESCAPES.

Specification forming part of Letters Patent No. 199,934, dated February 5, 1878; application filed June 6, 1877.

*To all whom it may concern:*

Be it known that I, CHARLES RICHARDS, of Cleveland, in the county of Cuyahoga and State of Ohio, have invented certain new and useful Improvements in Fire-Escapes; and I do hereby declare the following to be a full, clear, and exact description of the invention, such as will enable others skilled in the art to which it pertains to make and use it, reference being had to the accompanying drawings, which form part of this specification.

My invention relates to fire-escapes; and consists in the parts and combinations as hereinafter specified and claimed.

Figure 6:
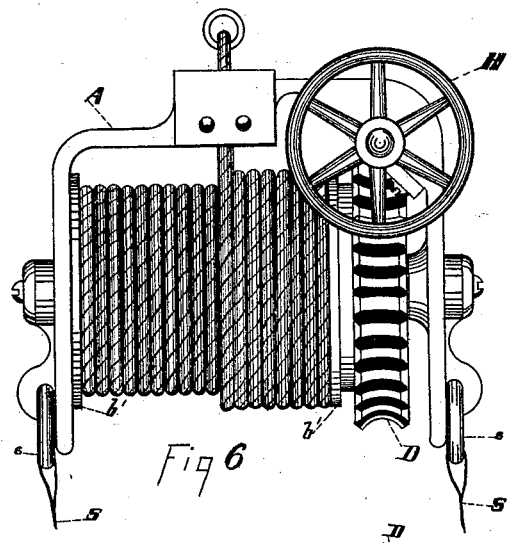
Figure 7:
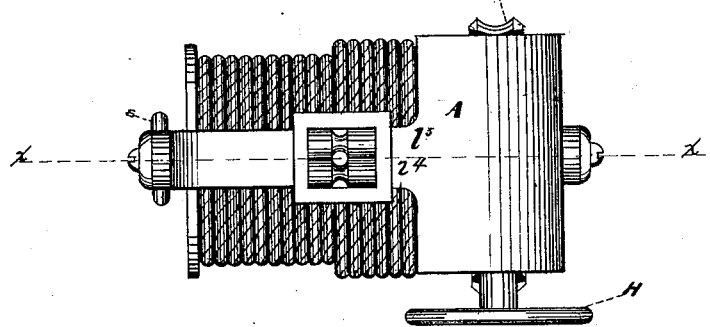
Figure 8:
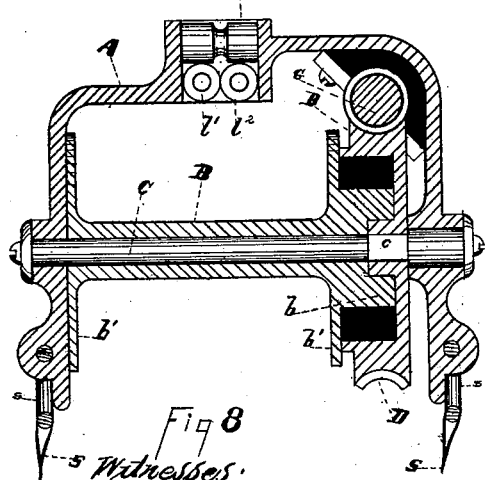
Figure 9:
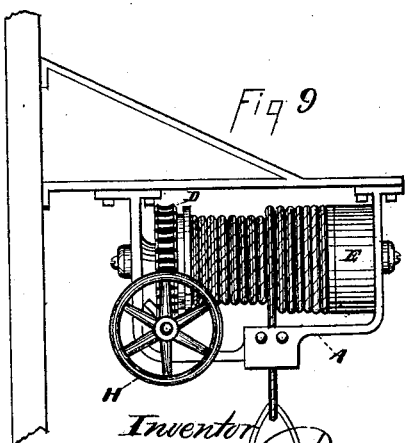

In the drawing, Figure 1, Sheet 1, represents a side view of a device embodying my invention. Fig. 2 is an end view. Fig. 3 represents a longitudinal sectional view. Fig. 4 represents a sectional view through the line $y\ y$ of Fig. 3. Fig. 5 is a similar view through the line $z\ z$ of the same figure. Fig. 6, Sheet 2, is a side elevation of a modification of the invention wherein the spring is omitted. Fig. 7 is a plan view of the same, also showing the guide-rollers for the rope. Fig. 8 is a longitudinal central section of the modification shown in Fig. 6. Fig. 9 shows the invention as it may be applied permanently to the window-casing or other portion of an apartment.

The object of my invention is the construction of a fire-escape small enough and light enough to be carried by a person or traveler in a valise or trunk, cheap enough to be possessed by everybody, and certain and effective in its operation.

A represents the frame of a machine, of any suitable metal, but preferably constructed of brass. B is the reel, journaled to the said frame. C is an axle, which passes freely through a central longitudinal opening in the same, the ends of said axle being journaled in the sides of the frame A. Said axle has a square or polygonal portion, $c$, to which is secured the gear-wheel D, which, therefore, always moves in the direction of and with the said shaft.

$b$ is a ratchet-wheel secured to or cast with the reel B on the outside of one of its disks or sides $b^1\ b^1$.

E is a casing fastened firmly to the frame of the device. $e$ is a rod or bar attached to the inside of said casing, to which is fastened one end of a spring, $e'$, the other end of which is secured to the hub or projection $b^2$ of the reel B. It is evident that the said spring can be wound by revolving the reel in the proper direction.

The disk $b^1$ runs close to the inner face of the casing E, which is thereby entirely closed, thus excluding dust, and preventing in a great measure any injury to the inclosed parts.

The gear-wheel D is provided with two projections, $d^1\ d^1$, to each of which a pawl, $d^3$, and spring $d^2$ are attached. The pawls engage with the ratchet-wheel $b$, and the springs press on the pawls to keep them in place. The object of this is to permit the revolution of the reel without moving the gear-wheel, which, under certain circumstances, is desired, as will be hereinafter explained.

To said frame A is also journaled the shaft G, which carries the worm-gear $g$, which latter meshes with the gear-wheel D. Said shaft carries on one end the wheel H, which serves the purpose of a speed-regulator, as will hereinafter appear.

The rope-guiding device consists of four rollers, two placed above the remaining two, and at right angles to the same. Each of the rollers $l^1\ l^2\ l^3\ l^4$ is cut out in a half-circle around its circumference, as shown, thus forming a central circular opening, through which the rope passes. This arrangement serves to guide the rope, and tends to secure a free and certain movement of the same, as the rope will always press upon some of the rollers. Said rope-guiding device is placed in the upper part of the frame above the reel. To the sides of the frame A are placed suitable rings $s$, or openings, or equivalent devices, to which a strap can be attached, by which the machine can be fastened to the body of a person. The strap, chain, or rope is represented in the drawing by letter S.

The operation of the device is as follows: The end of the rope is fastened to the leg of a table, bedstead, or other handy and sufficiently strong body, the end of the rope being provided with a ring or other device, which serves to retain the end of the rope in place. The machine is then fastened to the body of the person by means of the strap. The person then lets himself out of the window, if that is the only place of escape, and his weight causes the rope to be unwound from the reel as the person descends. The revolution of the reel carries with it the ratchet-wheel $b$, which revolves in a direction to bear against the pawls, and thus carries with it the gear-wheel. Said gear-wheel, as it is thus revolved, turns the shaft G through the medium of the worm $g$. If the person descends more rapidly than is desirable or agreeable, it is only necessary for him to place his hand on the wheel H and retard its motion, which he can instantly accomplish. The slower the shaft G on which the worm-gear is secured revolves the slower, of course, will the drum revolve and the rope be unwound, so that the velocity of descent is always within the control of the person to whom the device is attached. When the person has reached the ground, and there are other persons to be rescued by the same machine from the same room or apartment, he unbuckles the device from his person and releases his hold on the same. The machine will then immediately and rapidly ascend by reason of the force of spring $e'$, which has been wound up, by the revolution of the reel in the uncoiling of the rope, and will rewind the rope which is secured to it onto the reel, and the machine will reach the point from which it previously descended, ready to be buckled to another person and to repeat the previous operation.

The machine can be constructed without this feature of the casing E with its spring, and thus make a less bulky machine. In such a case, when the person reaches the bottom or ground with the machine, he can either release himself from the same or remove the end of the rope from the reel, which can be so arranged and constructed that he can quickly and easily do so.

The rope may be of any material strong enough for the purpose, and yet of a thickness to allow about fifty feet thereof to be wound on a reel of suitable size. Wire-rope is, of course, best adapted to the purpose.

The spring $e'$ may be omitted, in which case, of course, a person using the device, upon reaching the ground, would carry his instrument away with him, instead of permitting it to ascend again to the room. Such a construction without the spring is shown in Figs. 6, 7, and 8. So, also, it is not essential that the party should carry the machine with him in descending; but it may be fastened permanently, by a suitable bracket, to the window-casing or other permanent portion of the apartment. In that case the person would slip the loop S about his body, and, while the machine remained above, he would gradually descend; the worm-gear $g$ operating as a cover to prevent a too rapid descent. In this last case the spring may or may not be employed for the purpose of returning the rope with its loop S.

What I claim is—

1. A fire-escape consisting in the combination, with a casing or frame-work provided with the body-strap, reel, and rope, of the worm-gear D $g$ and hand-wheel H, substantially as described.

2. In a fire-escape, the combination of the frame with the rollers $l^1$ $l^2$ $l^3$ $l^4$, provided each with a semicircular groove, for the purpose of guiding the rope, substantially as described.

In testimony whereof I have signed my name to this specification in the presence of two subscribing witnesses.

CHAS. RICHARDS.

Witnesses:
 WM. BEHRENS,
 FRANCIS TOUMEY.